(12) United States Patent
Maanum et al.

(10) Patent No.: US 8,978,341 B2
(45) Date of Patent: Mar. 17, 2015

(54) CORE HOLE BACK STOP

(71) Applicant: T3 Enterprises, LLC, Marine on Saint Croix, MN (US)

(72) Inventors: Thomas C. James Maanum, Maple Grove, MN (US); Thomas Johnson, Center City, MN (US)

(73) Assignee: T3 Enterprises, LLC, Marine on Saint Croix, MN (US)

( * ) Notice: Subject to any disclaimer, the term of this patent is extended or adjusted under 35 U.S.C. 154(b) by 57 days.

(21) Appl. No.: 13/662,991

(22) Filed: Oct. 29, 2012

(65) Prior Publication Data

US 2013/0312362 A1 Nov. 28, 2013

Related U.S. Application Data

(60) Provisional application No. 61/552,299, filed on Oct. 27, 2011.

(51) Int. Cl.
  *E04G 23/00* (2006.01)
  *F16K 3/03* (2006.01)
  *E04G 21/02* (2006.01)
  *E04G 23/02* (2006.01)

(52) U.S. Cl.
  CPC . *F16K 3/03* (2013.01); *E04G 21/02* (2013.01); *E04G 23/0203* (2013.01)
  USPC ............................. 52/742.13; 52/742.14; 52/2

(58) Field of Classification Search
  CPC ............ E04G 23/0203; E04G 23/0207; E04G 23/0214
  USPC ........... 52/742.13, 742.14, 220.1, 220.8, 514, 52/302.7; 49/463
  See application file for complete search history.

(56) References Cited

U.S. PATENT DOCUMENTS

| | | | | | |
|---|---|---|---|---|---|
| 3,373,467 | A | * | 3/1968 | Loughrey | 425/12 |
| 4,100,712 | A | * | 7/1978 | Hyman | 52/514 |
| 4,354,332 | A | * | 10/1982 | Lentz | 52/514 |
| 5,058,519 | A | * | 10/1991 | Collins | 114/227 |
| 5,778,624 | A | * | 7/1998 | Russell | 52/514 |
| 6,508,040 | B2 | * | 1/2003 | Nelson | 52/514 |
| 7,121,054 | B2 | * | 10/2006 | Shock | 52/514.5 |
| 7,703,255 | B1 | * | 4/2010 | Norrid | 52/514 |
| 8,499,497 | B1 | * | 8/2013 | Hugueley | 49/463 |
| 8,615,949 | B2 | * | 12/2013 | Georgievski | 52/514 |

* cited by examiner

*Primary Examiner* — Jeanette E Chapman
*Assistant Examiner* — Daniel Kenny
(74) *Attorney, Agent, or Firm* — Westman, Champlin & Koehler, P.A.; Theodore M. Magee

(57) ABSTRACT

A method of inserting material into a hole formed through a building structure includes inserting a cover assembly into the hole formed through the building structure, moving at least a portion of the cover assembly from an insertion position to a deployed position, and inserting material into the hole with the cover assembly in the deployed position. An apparatus for filling a hole formed between first and second sides of a building structure includes a cover assembly insertable into the hole from the first side of the building structure, a connector configured to be positioned on the first side of the building structure, and a fastening mechanism configured to secure the cover assembly relative to the connector.

8 Claims, 12 Drawing Sheets

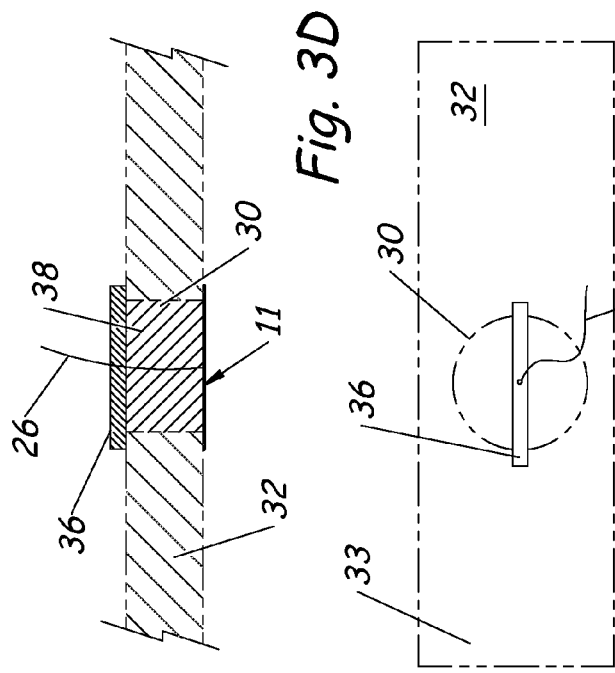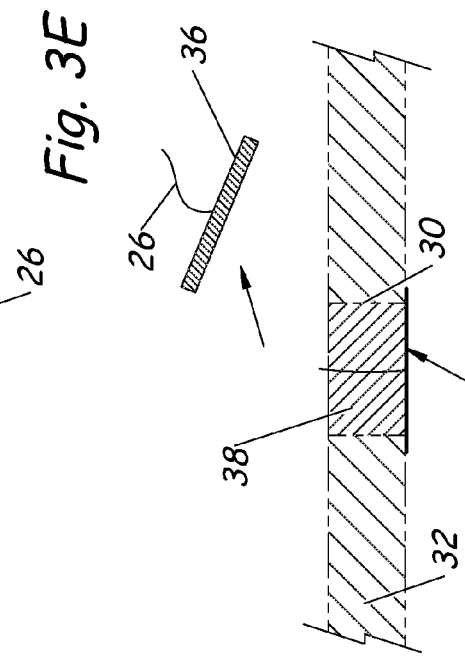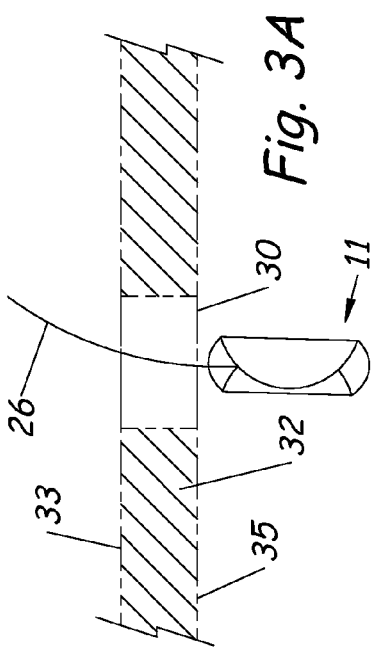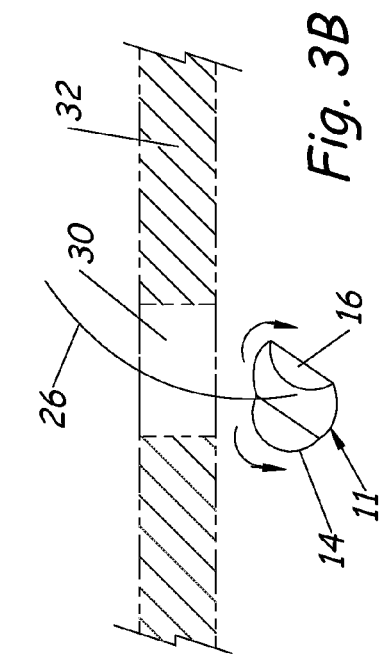

US 8,978,341 B2

CORE HOLE BACK STOP

CROSS-REFERENCE TO RELATED APPLICATION

The present application is based on and claims the benefit of U.S. provisional patent application Ser. No. 61/552,299, filed Oct. 27, 2011, the content of which is hereby incorporated by reference in its entirety.

BACKGROUND

Current building construction often involves the use of concrete or other similar materials in the formation of floors and sometimes walls in a building. In high rise buildings, for example, each floor is formed of concrete, and walls can be formed of metal or concrete as well.

While concrete or other similar materials provide a high degree of strength and efficiency in construction, they do present some problems. For instance, there are a wide variety of structural items or conduits that must traverse a plurality of different floors in the constructed building. By way of example, pipes, electrical conduits, and HVAC conduits extend vertically through the structure. Therefore, this requires holes to be made in the concrete floors or walls so that the conduits can run from one floor to another, or from one portion of the structure to another.

The discussion above is merely provided for general background information and is not intended to be used as an aid in determining the scope of the claimed subject matter. The claimed subject matter is not limited to implementations that solve any or all disadvantages noted in the background.

SUMMARY

In one exemplary embodiment, a method of inserting material into a hole formed through a building structure is provided. The method includes inserting a cover assembly into the hole formed through the building structure, moving at least a portion of the cover assembly from an insertion position to a deployed position, and inserting material into the hole with the cover assembly in the deployed position.

In one exemplary embodiment, an apparatus for filling a hole formed between first and second sides of a building structure is provided. The apparatus includes a cover assembly insertable into the hole from the first side of the building structure, a connector configured to be positioned on the first side of the building structure, and a fastening mechanism configured to secure the cover assembly relative to the connector.

In one exemplary embodiment, an apparatus for filling a hole formed in a building structure is provided. The apparatus includes a cover assembly insertable into the hole formed in the building structure, a connector configured to be positioned on a side of the building structure, and a fastening mechanism configured to support the cover assembly relative to the connector. The cover assembly comprises a first portion, a second portion, and a hinge assembly pivotably coupling the second portion to the first portion such that the cover assembly is movable between a first, insertion position having a collapsed profile and a second, deployed position having an expanded profile.

In one exemplary embodiment, a cover assembly can have a diameter that is sufficient to cover a given hole that needs to be filled. The cover assembly is foldable, or otherwise reducible in size, so that it can fit through the hole and then be unfolded. The user inserts the cover assembly through the hole and allows panels to unfold so that the assembly covers the hole from the bottom (or from the opposite side from the user). The user then draws the assembly up against the floor surrounding the hole with a connector (such as a chain) and secures the assembly against the opposite side of the hole with the connector. The user then fills the hole with concrete (or other filler material), which is held in place by the cover assembly. Once the concrete is set, the user can simply sever the connector, such as by cutting the chain, leaving the cover assembly in place.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 3A-3F are schematic diagrams illustrating an exemplary process for deploying a cover assembly to fill a hole formed in a floor, under one embodiment.

DETAILED DESCRIPTION OF ILLUSTRATIVE EMBODIMENTS

In some construction projects, to accommodate structural items or conduits that must traverse a plurality of different floors builders form core holes in the concrete floors or walls, when the concrete is being poured, or they bore the holes shortly after the concrete sets. In either case, the builders may not know exactly how many holes are required, or where they are required. Therefore, for a relatively large building, a builder may form hundreds of holes through a single concrete floor in a building so that, no matter where the holes are required, there is one preformed hole close enough to that location that it can be used.

This can cause difficulties as well. For instance, there are many preformed holes that go unused. For relatively large construction projects, the number of unused holes may number in the dozens, or hundreds, for each floor. After all of the necessary holes are used, the builder must then plug (or refill) the unused holes. This has conventionally been a very inefficient process. In order to fill the unused holes, the builders have conventionally gone to the floor below the hole that is being filled, and set up a jack that is used to hold a form against the ceiling on that floor, underneath the hole to be filled. The builder then goes up one floor, and locates the hole for which the form has been erected. The builder then fills that hole with concrete and allows it to set. Once the concrete has set, and the unused hole is filled, the builder must then go back down one floor and remove the jack and form beneath the now-plugged hole. This process must be repeated for every unused hole that needs to be filled in the construction project. This requires extensive time on behalf of the builders and is very inefficient.

Figure 1:
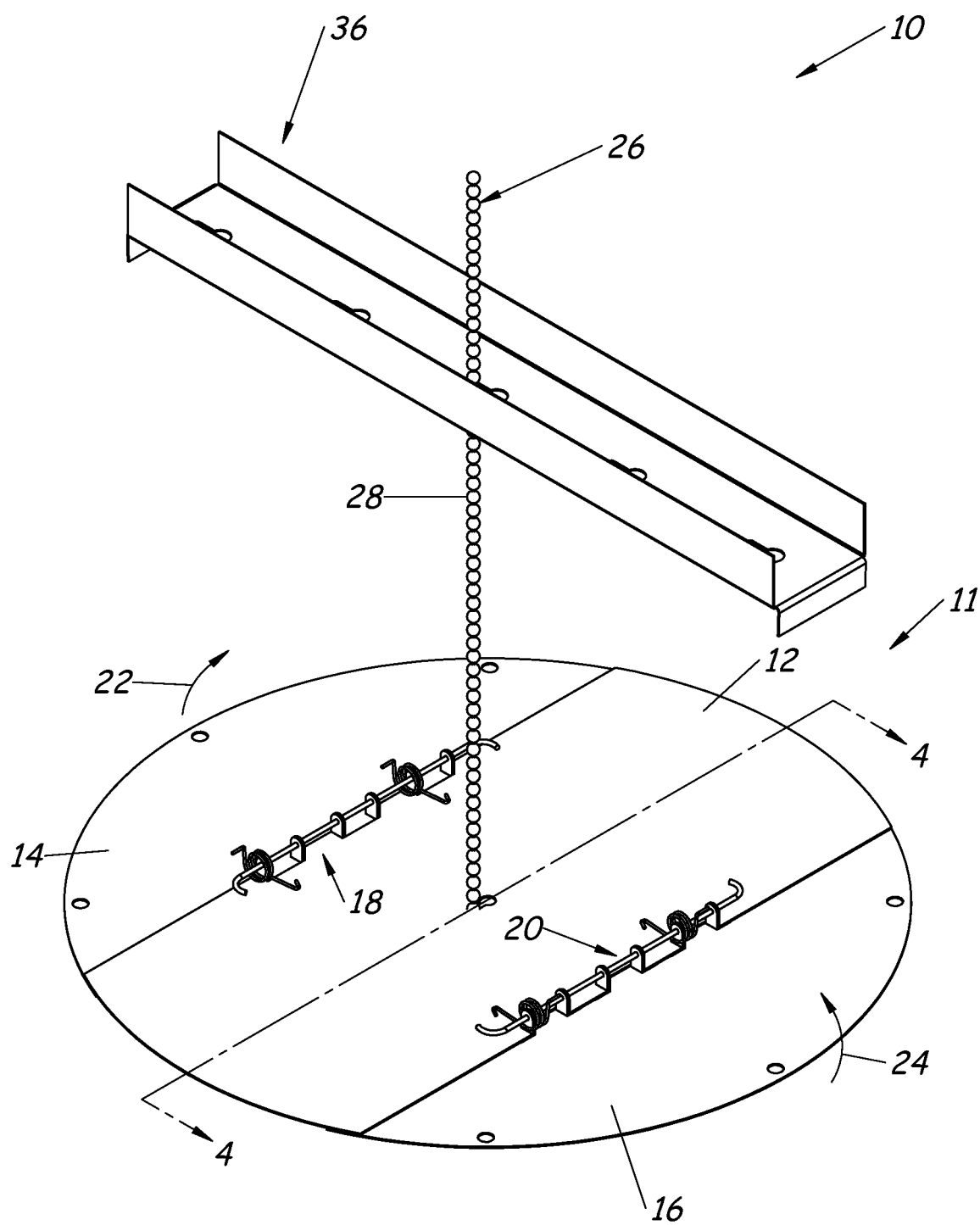
FIG. 1 is a perspective view of an exemplary apparatus for filling a hole formed in a building structure, under one embodiment.
Figure 2:
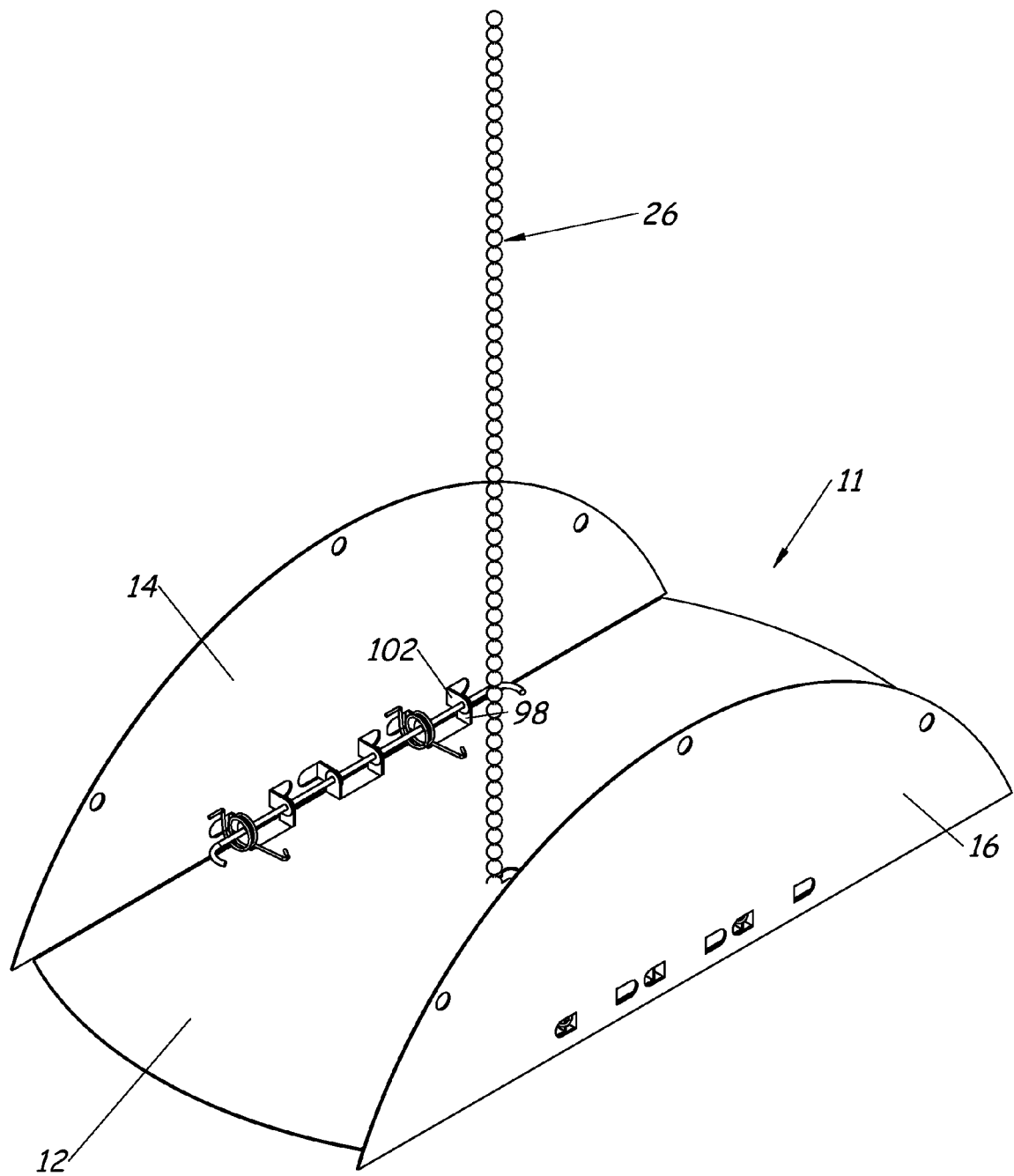
FIG. 2 is a perspective view of an exemplary cover assembly in an insertion position, under one embodiment.

FIG. 1 is a perspective view of an exemplary apparatus 10 for filling a hole, such as a core hole formed in a floor or wall of a building structure. Apparatus 10 includes a cover assembly 11, which is shown in FIG. 1 in a deployed or open position. FIG. 2 is a perspective view of cover assembly 11 in an insertion or folded position in which cover assembly 11 has a collapsed or reduced profile.

As discussed in further detail below, the reduced profile allows cover assembly 11 to be inserted into and through a hole to be filled, and the open or deployed position illustrated in FIG. 1 is configured to provide a barrier for filling the hole with material (e.g., concrete or other filler material). Apparatus 10 illustratively includes a connector 36 and fastening mechanism 26 (such as a chain or cord) for supporting cover assembly 11 relative to the hole to be filled. Cover assembly 11 can be formed of any suitable material, such as but not limited to steel. In one particular example, cover assembly 11 is formed of steel have a thickness between 10 and 20 gauge.

Fastening mechanism 26 is configured to support cover assembly 11 at a desired distance from connector 36, which is positioned on a first side of the building structure. For example, in one embodiment a chain or cord has knots, beads or other increased diameter portions 28 disposed along the length thereof. In this manner, cover assembly 11 can be positioned at a plurality of different distances from connector 36 to accommodate holes of varying lengths. The use of fastening mechanism 26 is described in further detail below.

In the embodiment of FIGS. 1 and 2, cover assembly 11 is movable to the insertion position by folding one or more portions of cover assembly 11. Illustratively, cover assembly 11 includes a central portion 12 and at least one movable panel. Surfaces of the panel can be substantially planar and/or curved. In the illustrated embodiment, a pair of substantially planar wing plates 14 and 16 are secured to central portion 12 by, in one embodiment, a set of hinges 18 and 20, respectively. Therefore, wing plates 14 and 16 can fold relative to central portion 12, to reduce the overall profile and perimeter of cover assembly 11. In the embodiment of FIGS. 1 and 2, wing plates 14 and 16 fold generally upward toward connector 36 in the directions indicated by arrows 22 and 24, respectively. Therefore, once folded, cover assembly 11 has the profile shown in FIG. 2.

In accordance with one embodiment, wing plates 14 and 16 are biased to the open position shown in FIG. 1. Therefore, while they can be folded to the position shown in FIG. 2, they can be biased, such as by using leaf springs or coil springs or another suitable bias mechanism, to the open position shown in FIG. 2.

While cover assembly 11 is movable to the insertion position by folding portions of cover assembly 11, other suitable mechanisms can be utilized. For example, but not by limitation, cover assembly 11 can have sliding portions that move radially outward relative to one other to achieve an expanded profile.

FIGS. 3A-3F are schematic diagrams illustrating an exemplary process for deploying a cover assembly to fill a hole 30 formed in a building structure, such as a core hole formed in a concrete floor 32 (or other similar structure) having a first, top side 33 and a second, bottom side 35. For purposes of illustration, and not by limitation, the process will be described with respect to cover assembly 11, discussed above with respect to FIGS. 1 and 2.

Illustratively, a user moves cover assembly 11 to the insertion position, such as by folding the cover assembly 11 from the open position shown in FIG. 1 to the folded position shown in FIG. 2. This is illustrated in FIG. 3A.

Then, the user inserts cover assembly 11 through the hole 30, maintaining a grip on fastening mechanism 26. As shown in FIG. 3B, cover assembly 11 folds out into the expanded position shown in FIG. 1. This can be done by simply allowing wing plates 14 and 16 to expand under spring bias, or by otherwise unfolding wing plates 14 and 16.

The user then withdraws fastening mechanism 26 back through hole 30 in the direction indicated by arrow 34 in FIG. 3C. The user thus draws cover assembly 11 illustratively into contact with the second side 35 of floor 32 opposite the first side 33 where the user resides. The user then illustratively secures cover assembly 11 in that position, as shown in FIG. 3D, using connector 36. In one embodiment, the connector 36 is releasably fastened to a portion of fastening mechanism 26 that extends upwardly from hole 30.

As shown in FIG. 3E, connector 36 illustratively does not cover the entire hole 30 and leaves at least a portion of hole 30 exposed adjacent the upper surface 33 of floor 32. In this manner, when cover assembly 11 is in the position shown in FIGS. 3D and 3E, the user can then insert or pour concrete or other filler material 38 into hole 30 from the top surface 33 and allow it to set. It can thus be seen that the user can successfully plug hole 30 (as shown in FIG. 3F) from only one side of the hole, without even needing to go to the opposite side of the hole. This produces great savings in time and energy on behalf of the user of cover assembly 11.

As also shown in FIG. 3F, once the material has set the user simply removes connector 36 and the portion of fastening mechanism 26 that extends upwardly out of the plug of material 38 that has plugged hole 30. For example, the user can cut fastening mechanism 26 to remove the portion extending above the plug of material 38.

Figure 4:
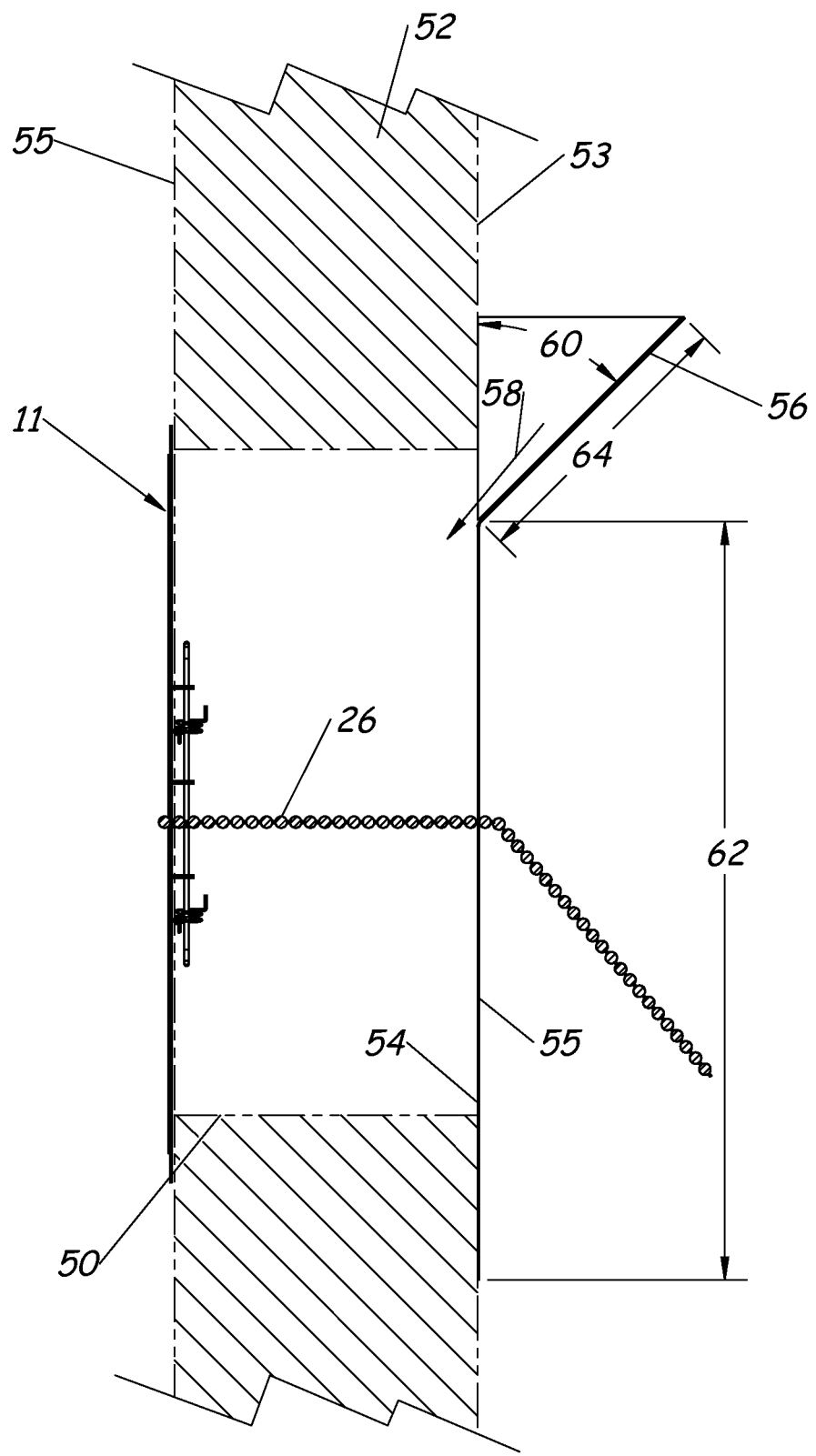
FIG. 4 is a section view of an exemplary apparatus for filling a hole formed in a vertical wall, under one embodiment

FIG. 4 illustrates an exemplary use of cover assembly 11 to fill a hole formed in a vertical building structure, such as a concrete wall 52 having a first side 53 and a second side 55. In FIG. 4, cover assembly 11 is shown in section view taken at line 4-4 illustrated in FIG. 1.

As illustrated in FIG. 4, cover assembly 11 has been inserted by a user through a hole 50 of wall 52 from the first side 53 to the second, opposite side 55. Cover assembly 11 has been drawn back toward the second side 55 so that it abuts wall 52 on the second side 55. FIG. 4 also shows that fastening mechanism 26 has been secured to a connector 54.

Connector 54 has a first portion 55 that is substantially parallel to the first side 53 of wall 52 and a second portion 56 that extends outwardly, and away, from the wall 52. This allows the user to insert concrete or filler material, as shown by arrow 58, into hole 50 in wall 52. In one example, an angle 60 of approximately 45 degrees is formed between portions 55 and 56. The first portion 55 covers a majority of the hole 50 on the first side 53 of the wall 52. In one example, portions 55 and 56 have heights 62 and 64 that are approximately two-thirds and one-third, respectively, of the diameter of hole 50.

Once the concrete or filler material has set, the user can remove connector 54 and the extra portion of fastening mechanism 26, such as in the manner described above with respect to FIG. 3F.

Figure 5:
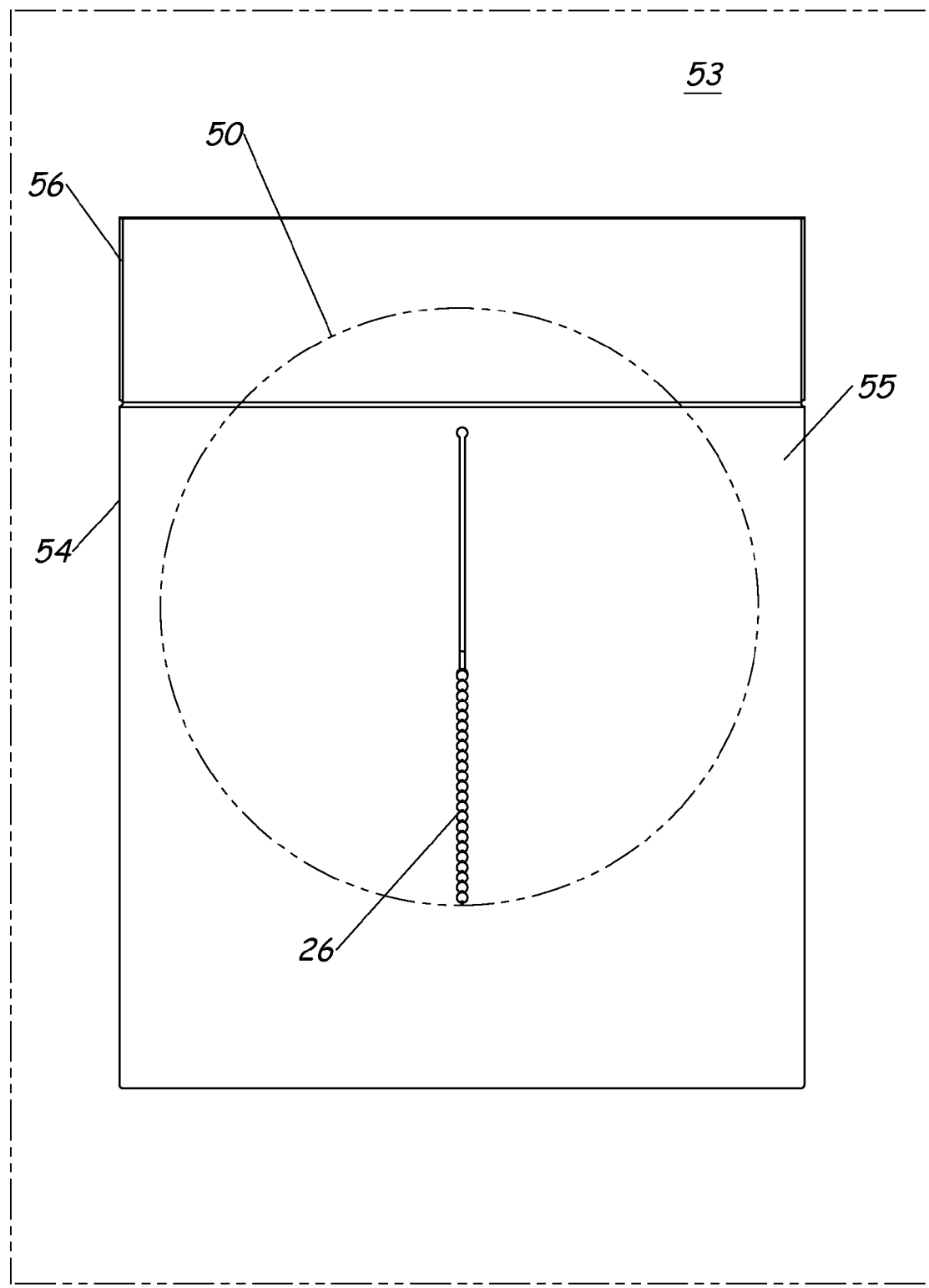
FIG. 5 is a plan view of an exemplary connector in the form of a plate, under one embodiment.
Figure 6:
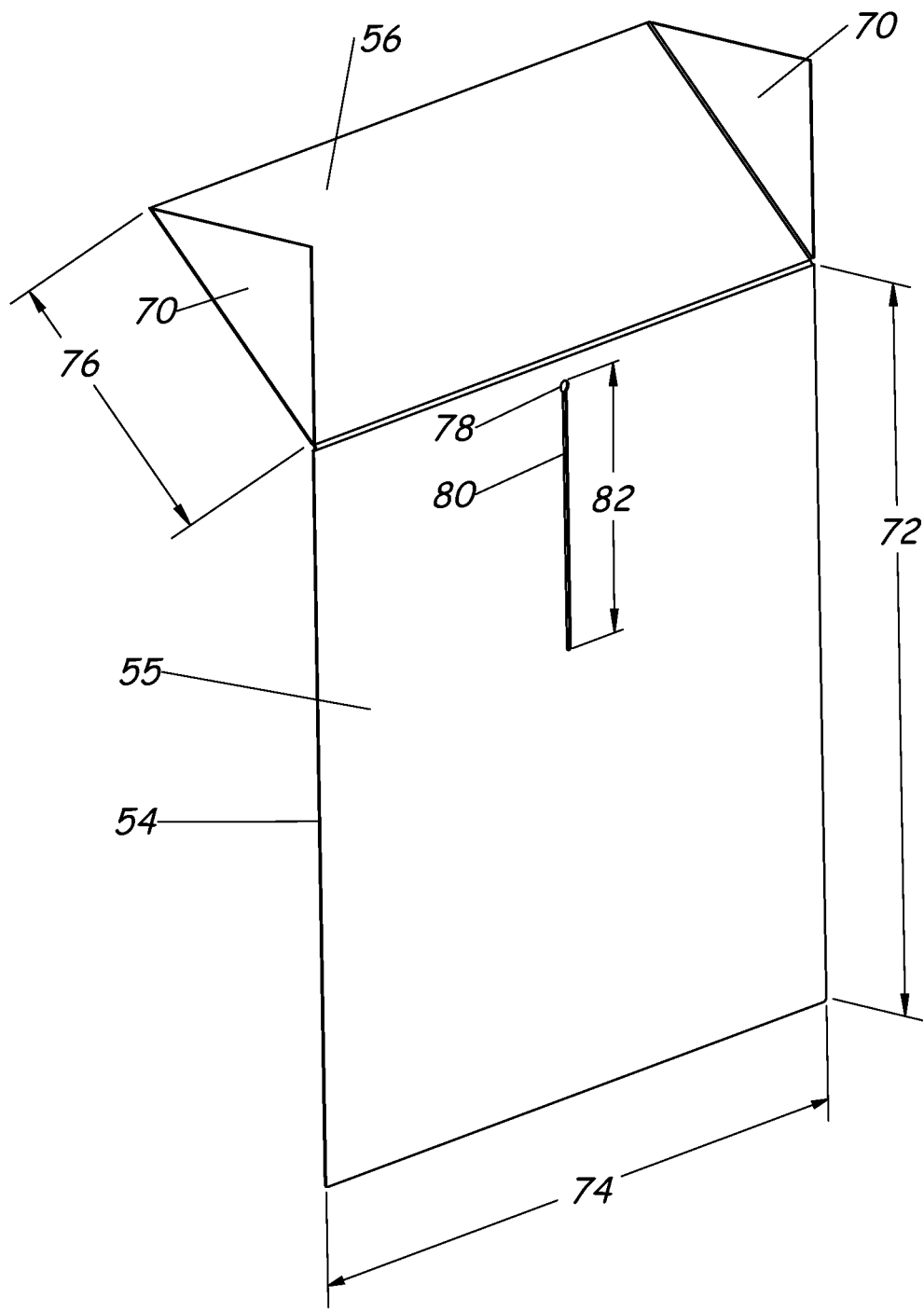
FIG. 6 is a perspective view of the connector illustrated in FIG. 5.

FIGS. 5 and 6 are plan and perspective views illustrating connector 54 having second portion 56 angled with respect to the first portion 55. The second portion 56 includes upwardly extending wings 70 that aid in pouring material into the hole covered by connector 54. In one example, portion 55 has a height 72 and width 74 of 13 inches and portion 56 has a height 76 of 5 inches.

Portion 55 includes a hole 78 and slot 80 configured to receive fastening mechanism 26 having increased diameter portions. Hole 78 is sized to allow the increased diameter portions to pass therethrough, whereas slot 80 is sized to prevent the increased diameter portions from passing therethrough while allowing the fastening mechanism 26 to be moved within slot 80 vertically. In one example, slot 80 has a length 82 of between 5 and 6 inches. Of course, the shapes and dimensions provided with respect to FIG. 6 are exemplary and can be varied based on the particular application and the size of the hole to be filled.

Figure 7:
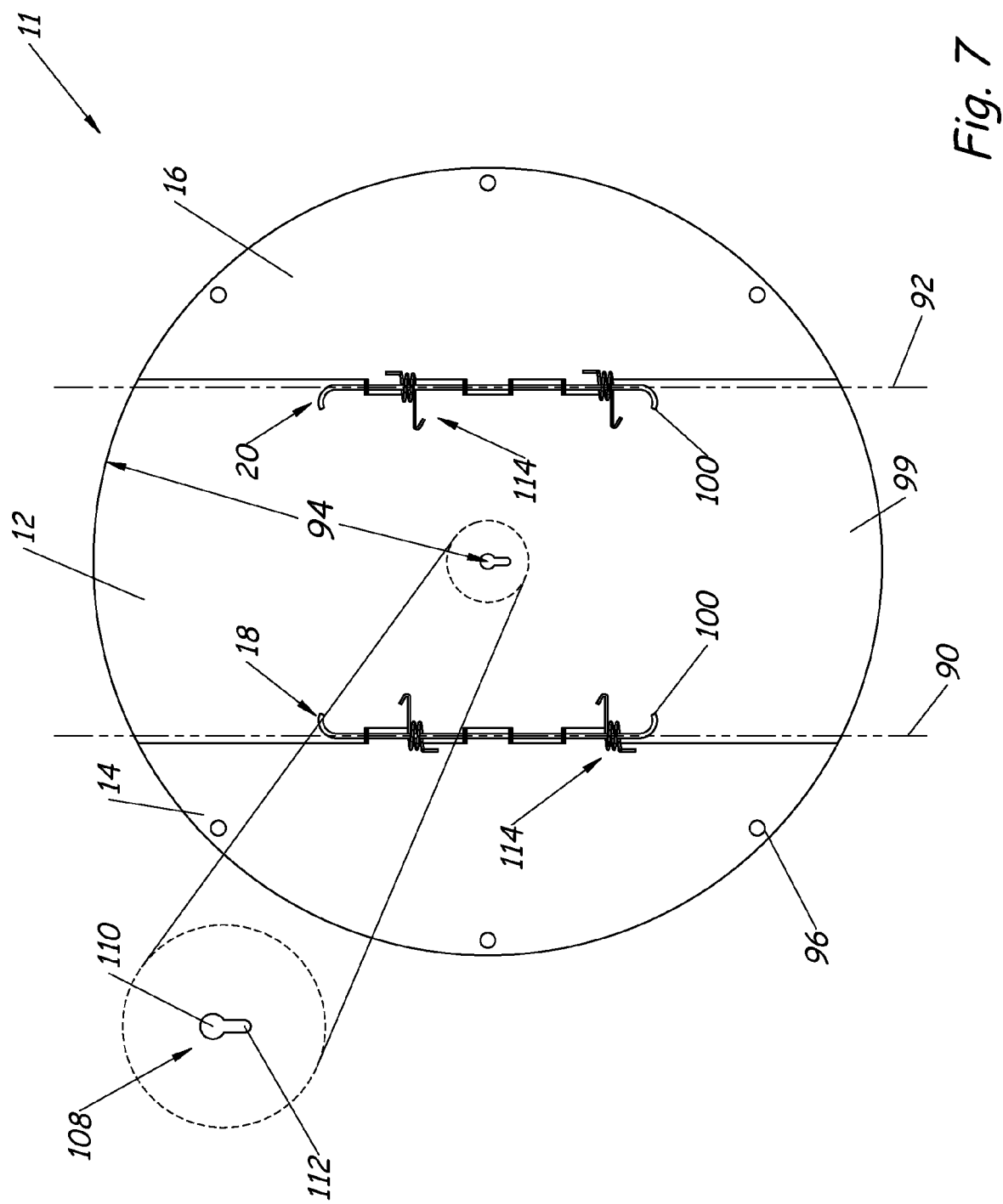
FIG. 7 is a plan view of an exemplary cover assembly, under one embodiment.

FIG. 7 is a plan view of cover assembly 11 having central portion 12 and wing plates 14 and 16 attached to central portion 12 by a set of hinges 18 and 20. Wing plates 14 and 16 pivot relative to central portion 12 about hinge axis 90 and 92, respectively. In one example, cover assembly 11 has a radius 94 of approximately 6.5 inches and is suitable for holes between 8 and 12 inches in diameter. In another example, cover assembly 11 has a radius 94 of approximately 4.5 inches and is suitable for holes between 4 and 8 inches in diameter. In another example, cover assembly 11 has a radius 94 of approximately 2.125 inches and is suitable for holes between 2 and 4 inches in diameter.

Cover assembly 11 can include one or more apertures 96 that are sized to allow air from the hole to pass therethrough as material is poured into the hole. In the embodiment illustrated in FIG. 7, a plurality of apertures 96 are provided and spaced approximately 45 degrees from one another. Each edge of central portion 12 includes at least one upright support 98 (shown in FIG. 2) configured to receive a corresponding hinge wire 100 extending along the respective hinge axis. Upright support 98 can be formed by bending portions of cover assembly 11 substantially perpendicular to top surface 99.

Figure 8:
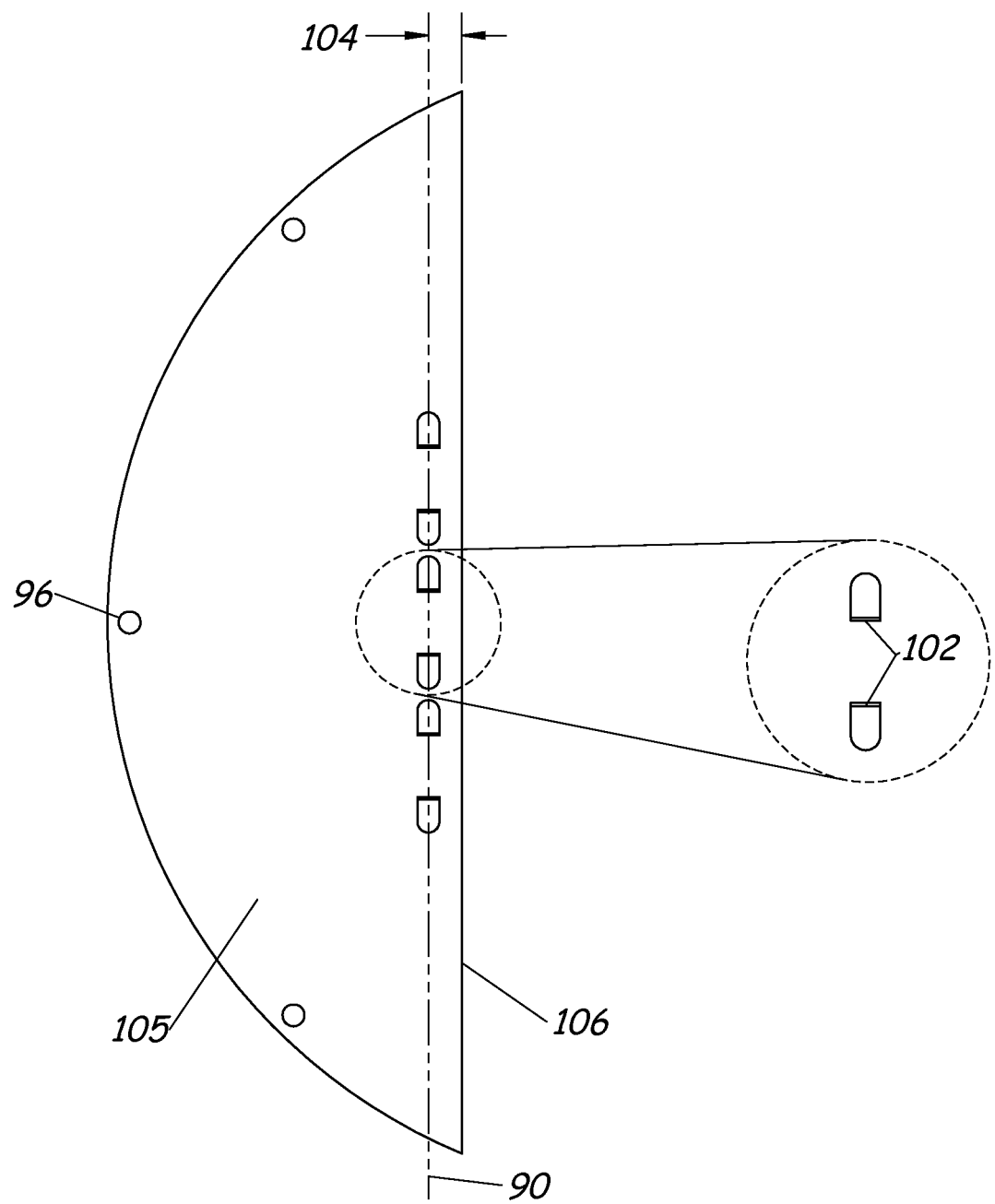
FIG. 8 is a plan view of an exemplary panel for a cover assembly, under one embodiment.

FIG. 8 is a plan view of wing plate 14. As illustrated, wing plate 14 includes at least one upright support 102 (also shown in FIG. 2) configured to receive therethrough and pivot on hinge wire 100. Hinge axis 90 is displaced a distance 104 from the edge 106 of wing plate 14 such that wing plate 14 overlaps central portion 12. Upright support 102 can be formed by bending portions of wing plate 14 substantially perpendicular to top surface 105. Wing plate 16 is, in one embodiment, a minor image of wing plate 14.

Cover assembly 11 can be either fixedly attached or removably couplable to fastening mechanism 26. With respect to the embodiment illustrated in FIG. 7, central portion 12 includes an aperture 108 configured to receive fastening mechanism 26. Aperture 108 illustratively includes a circular portion 110 and an elongate slot portion 112. Portion 110 is configured to allow the increased diameter portions 28 of fastening mechanism 26 to pass therethrough, whereas slot 112 has a reduced cross section that prevents the increased diameter portions 28 from passing therethrough while allowing the fastening mechanism 28 to be moved into and out of slot 112. In this manner, cover assembly 11 is removably supported on fastening mechanism 26 and can be positioned at a plurality of locations along the length of fastening mechanism 26.

Each hinge 18 and 20 includes one or more spring assemblies 114 configured to bias the wing plates 14 and 16 to the opened or deployed position illustrated in FIG. 7.

It is noted that the geometries and dimensions provided with respect to FIGS. 7 and 8 are exemplary and can be varied based on the particular application, such as the size and shape of the hole to be filled.

Figure 9:
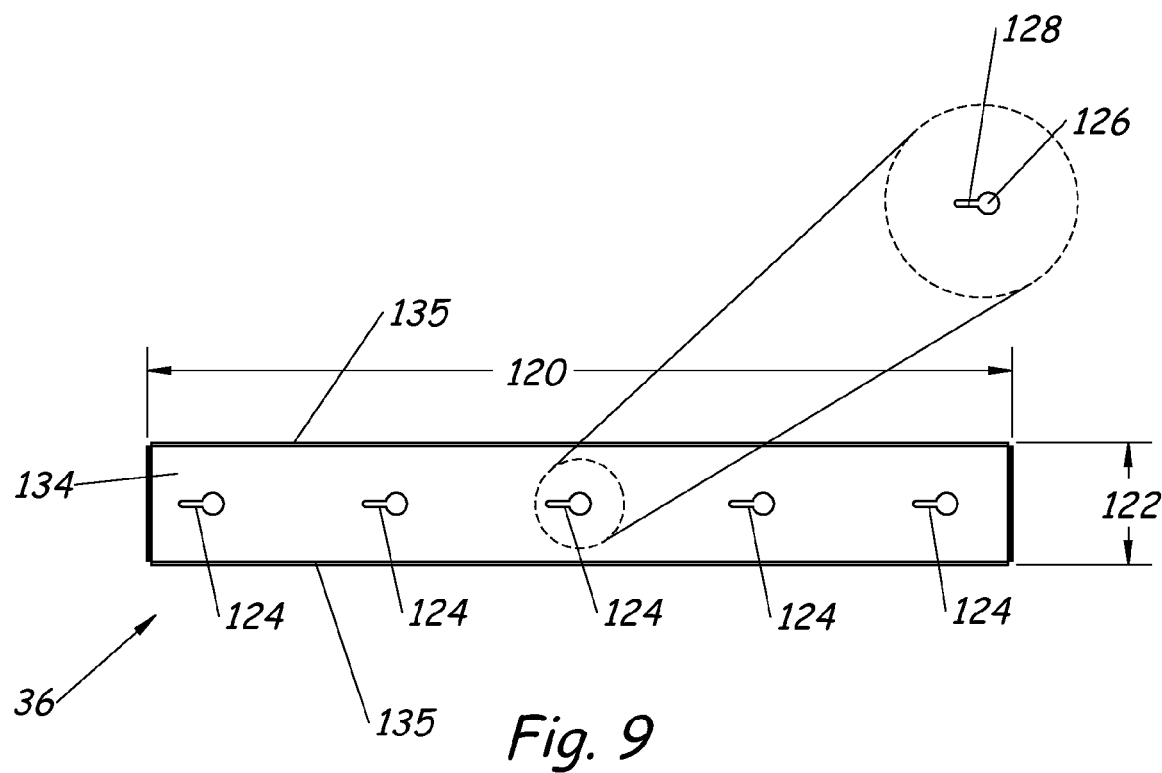
FIGS. 9 and 10 are top and side views illustrating an exemplary connector, under one embodiment.
Figure 10:
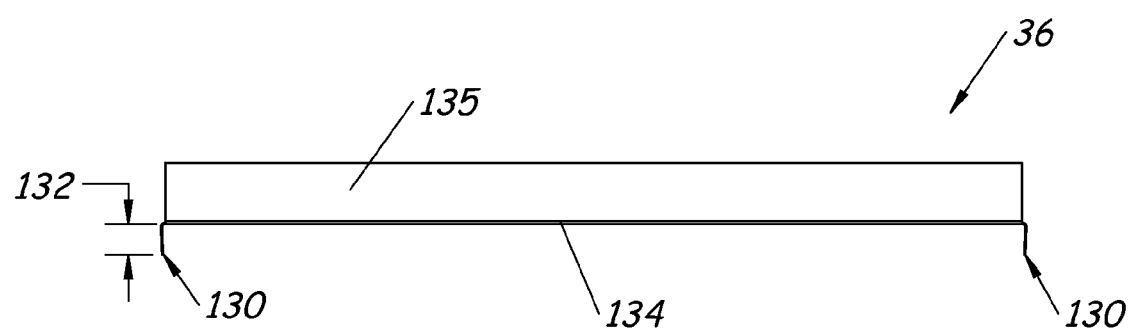

FIGS. 9 and 10 are top and side views, respectively, of connector 36 in the form of an elongate bar. Connector 36 has a length 120 and a width 122. In one example, length 120 and width 122 are approximately 14 inches and 2 inches, respectively. As illustrated in FIG. 10, connector 36 has bottom surfaces 130 configured to engage a surface of the building structure and are spaced a distance 132 from a plate or channel member 134 having a plurality of apertures 124 formed therein. Connector 36 also includes a pair of upwardly extending sidewalls 135 positioned on opposing sides of apertures 124. Sidewalls 135 can be utilized to retain and prevent any excess portion of fastening mechanism 26 from falling into the material poured into the hole.

Each aperture 124 is configured for receiving fastening mechanism 26 and includes a circular portion 126 sized to allow the increased diameter portions 28 of fastening mechanism 26 to pass therethrough and a slot 128 sized to engage increased diameter portions 28 to secure fastening mechanism 26 relative to connector 36. Therefore, when the user draws fastening mechanism 26 upwardly through hole 30, the increased diameter portions (or beads) 28 can be withdrawn through the aperture 124 in connector 36, and then the fastening mechanism 26 can be slipped into the slot 128. In one embodiment, aperture 124 is substantially similar to aperture 108 described with respect to FIG. 7.

It is noted that the geometries and dimensions provided with respect to FIGS. 9 and 10 are exemplary and can be varied based on the particular application, such as the size and shape of the hole to be filled.

Figure 11:
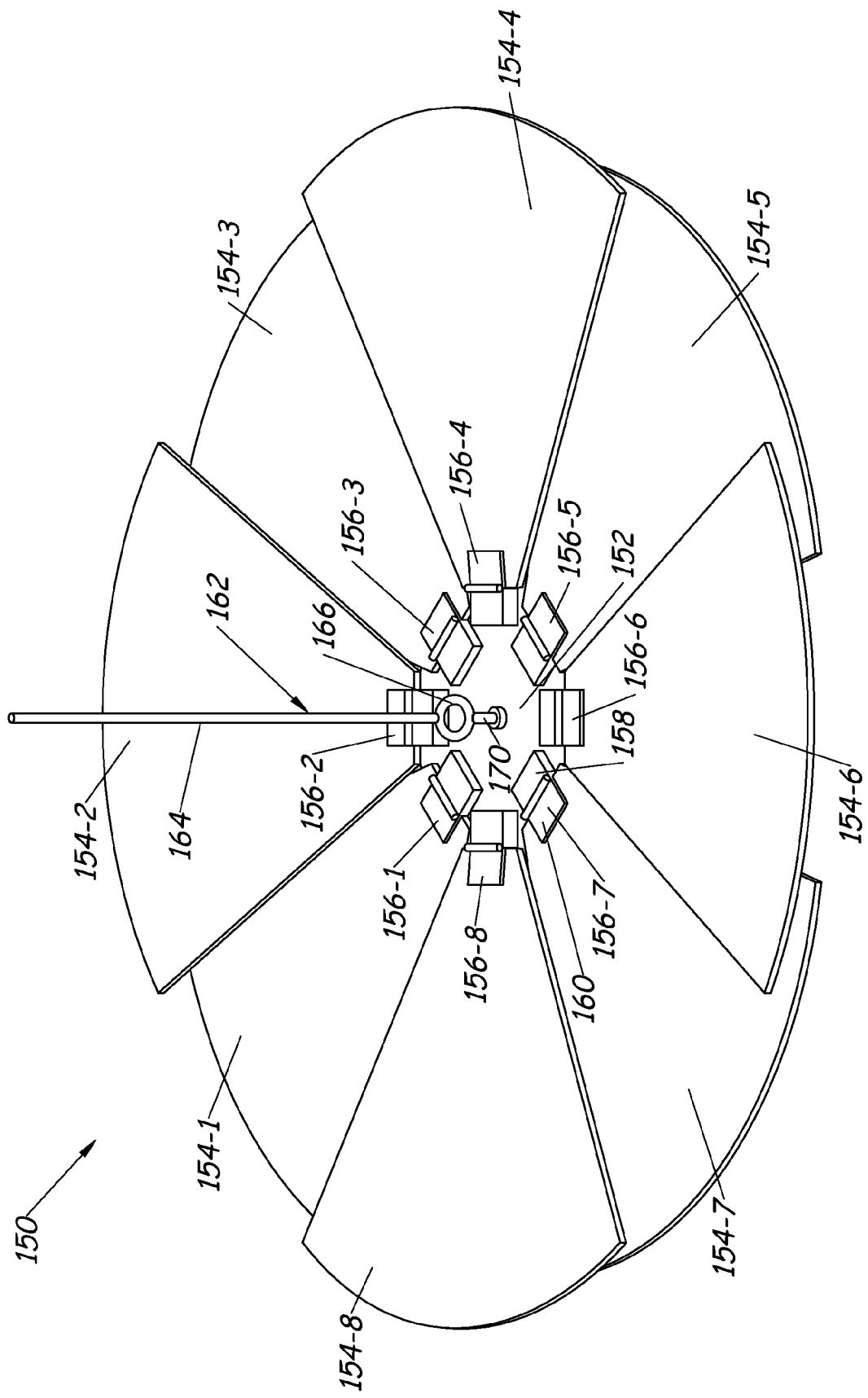
FIGS. 11 and 12 are top and bottom perspective views of an exemplary cover assembly, under one embodiment.
Figure 12:
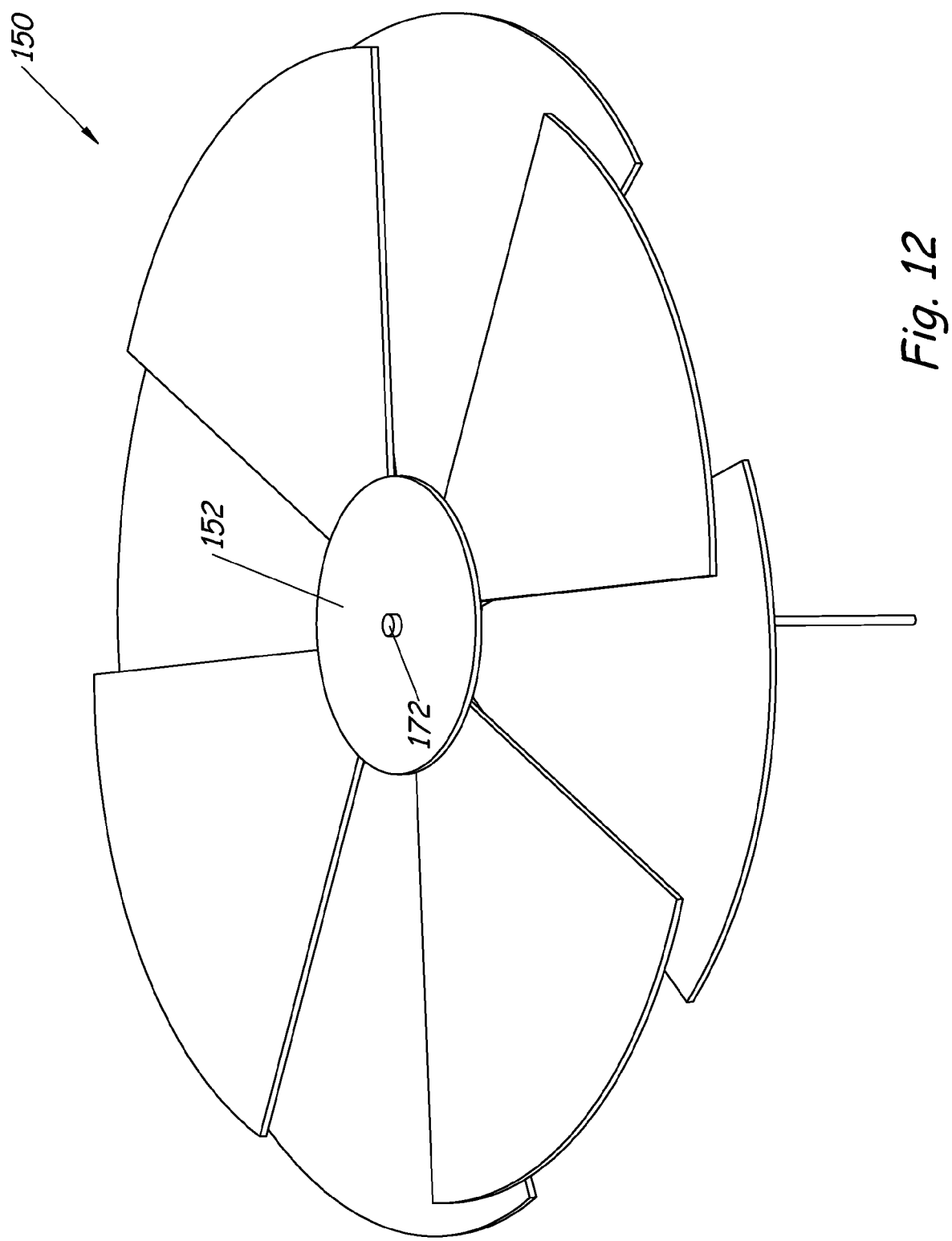

FIGS. 11 and 12 are top and bottom perspective views, respectively, illustrating one embodiment of a cover assembly 150. Cover assembly 150 has a central portion 152 and a plurality of radially positioned panels in the form of wing plates 154-1, 154-2, 154-3, 154-4, 154-5, 154-6, 154-7, and 154-8 (collectively referred to as wing plates 154). In one example, cover assembly 150 has at least three wing plates 154. In the illustrated embodiment, cover assembly 150 has eight wing plates 154. However, more or less than eight wing plates 154 can be utilized. Further, while the top and bottom surfaces of central portion 152 and the radially positioned panels are illustrated as substantially planar, it is noted that alternatively, or in addition, the surfaces can have one or more curved portions.

Each wing plate 154 is pivotably coupled to central portion 152 by a respective hinge assembly 156-1, 156-2, 156-3, 156-4, 156-5, 156-6, 156-7, and 156-8 (collectively referred to as hinge assemblies 156). Each hinge assembly 156 has a first portion 158 attached to the top surface of central portion 152 and a second portion 160 attached to the top surface of the respective wing plate 154. Portion 160 is pivotable with respect to portion 158 about a pivot axis. Any suitable fasteners (not shown in FIG. 11) can be utilized to secure portions 158 and 160, such as but not limited to screws, bolts, adhesives, and the like.

A fastening mechanism 162 is attached to central portion 152. In the illustrated embodiment, fastening mechanism 162 includes a cord or chain 164 attached to central portion 152 using an eye bolt 166. Eye bolt 166 has a loop end 168 to which cord or chain 164 is attached and a threaded end 170 received within an aperture formed in central portion 152. A nut 172 can be used to secure eye bolt 166 to central portion 152.

Figure 13:
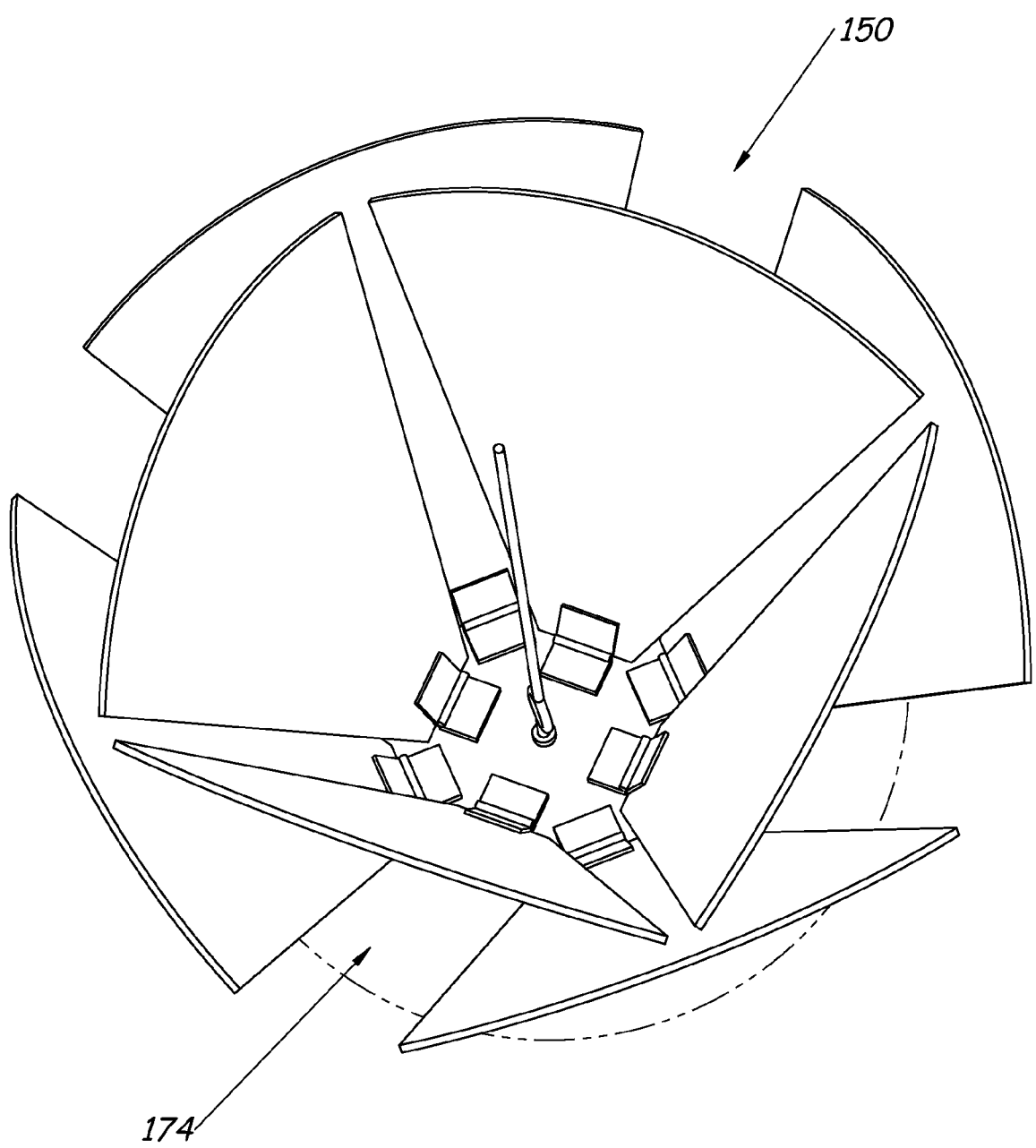
FIG. 13 illustrates the cover assembly of FIG. 11 in an insertion position, under one embodiment.

Wing plates 154 are generally wedge-shaped and are attached to central portion 152 in a layered manner such that adjacent wing plates 154 overlap one another. In the illustrated embodiment, portions of a first wing plate 154-1 are positioned under adjacent wing plates 154-2 and 154-8. By way of example, hinge assembly 156-2 connecting wing plate 154-2 to central portion 152 has an elevated position relative to hinge assembly 156-1 such that the hinge axis of hinge assembly 156-2 is vertically offset above the hinge axes of hinge assemblies 156-1 and 156-3. The plurality of wing plates 154 pivot from a deployed or open position illustrated in FIG. 11 to an insertion or folded position illustrated in FIG. 13 in which cover assembly 150 has a reduced or collapsed profile for insertion through a hole 174.

In one exemplary use, the cover assembly 150 is manually moved to the insertion position by a user pivoting the wing plates 154 prior to insertion into the hole. In another example, while in the deployed position the cover assembly 150 is lowered toward the hole. The wing plates 154 contact the building structure causing upward pivoting of the wing plates 154 relative to the central portion 152. Once through the hole, the wing plates 154 pivot downwardly toward the deployed position of FIG. 11 and the cover assembly 150 can be pulled back toward and into engagement with the opposing side of the building structure.

In one embodiment, the hinge assemblies 156 can be configured to prevent the wing plates 154 from reaching a position perpendicular to the central portion 152. In this manner, the wing plates 154 are retained at oblique angles to ensure that the wing plates 154 pivot due to gravity to the deployed position after passing through the hole. Alternatively, or in addition, the hinge assemblies 156 can be provide with spring assemblies to bias the wing plates 154 to the deployed position.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for filling a hole formed between first and second sides of a building structure, the apparatus comprising:
   a cover assembly insertable into the hole from the first side of the building structure, the cover assembly comprising a plurality of wing plates layered over a top surface of a central portion such that adjacent wing plates overlap each other while extending radially outward from the central portion;
   a connector configured to be positioned on the first side of the building structure such that bottom surfaces of at least two leg portions of the connector engage the first side of the building structure and maintain a bottom surface of a plate of the connector a spaced distance above the hole; and
   a fastening mechanism configured to secure the cover assembly relative to the plate of the connector.

2. The apparatus of claim 1, wherein the cover assembly is collapsible from a first, deployed position to a second, insertion position.

3. The apparatus of claim 2, wherein the cover assembly has a substantially circular outer periphery in the deployed position.

4. The apparatus of claim 2, wherein the cover assembly comprises:
   one or more hinge assemblies pivotably connecting the plurality of wing plates to the central portion.

5. The apparatus of claim 2, wherein the fastening mechanism comprises a chain or cord having at least one increased diameter portion.

6. The apparatus of claim 5, wherein the connector has an aperture formed therein for receiving the chain or cord, the aperture of the connector comprising:
   a first portion having a size greater than the increased diameter portion of the chain or cord to allow the increased diameter portion to pass therethrough; and
   a second portion having a size less than the increased diameter portion of the chain or cord to prevent the increased diameter portion from passing therethrough.

7. An apparatus for filling a hole formed in a building structure, the apparatus comprising:
   a cover assembly insertable into the hole formed in the building structure, the cover assembly comprising:
   a first portion;
   a second portion layered on top of the first portion; and
   a hinge assembly pivotably coupling the second portion to the first portion such that the cover assembly is movable between a first, insertion position having a collapsed profile and a second, deployed position having an expanded profile;
   a connector configured to be positioned on the first side of the building structure such that bottom surfaces of at least two leg portions of the connector engage the first side of the building structure and maintain a bottom surface of a plate of the connector a spaced distance above the hole; and
   a fastening mechanism configured to support the cover assembly relative to the plate of the connector.

8. The apparatus of claim 7, wherein the first portion comprises a central panel and the second portion comprises a plurality of overlapping panels radially positioned and movable relative to the central panel.

* * * * *